Figure 1:
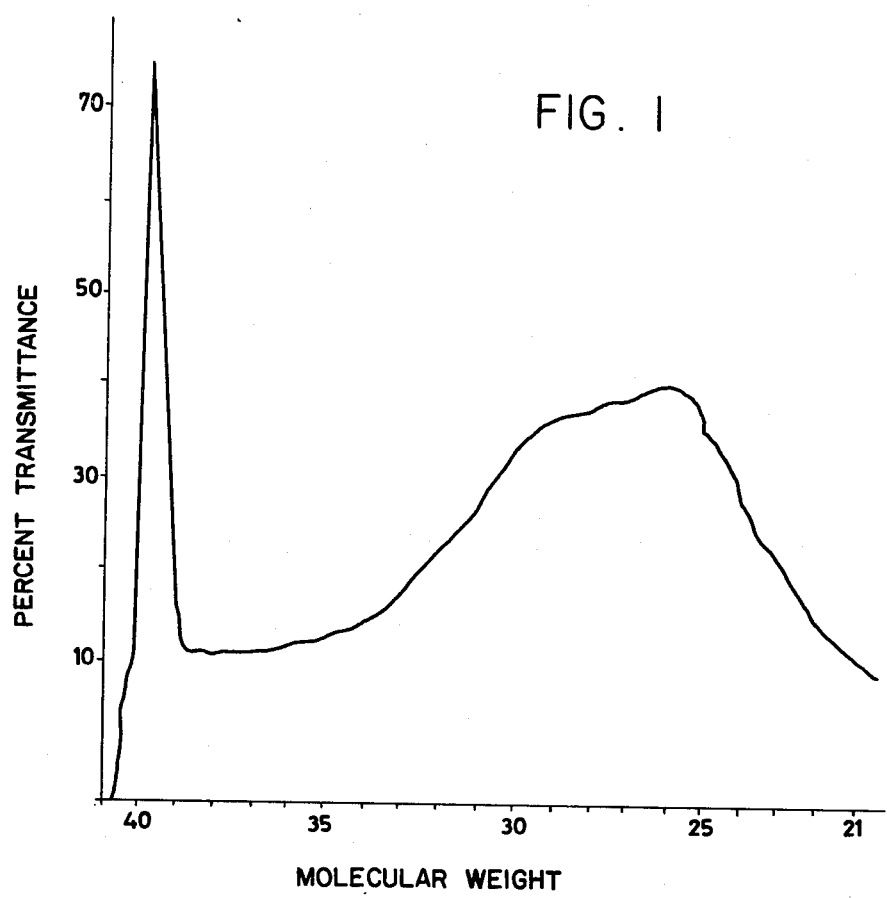

United States Patent [19]
Caporossi et al.

[11] 4,456,731
[45] Jun. 26, 1984

[54] COMPOSITION FOR LINING THE WALLS OF REACTORS AND CONNECTED APPARATUS USED FOR POLYMERIZING VINYL COMPOUNDS WHICH PREVENTS OR REDUCES DEPOSITS AND INCRUSTATIONS ON SAID APPARATUS, AND THE METHOD FOR ITS USE

[75] Inventors: Adolfo Caporossi, Ravenna; Leonello Del Signore, L'Aquila, both of Italy

[73] Assignee: Anic S.p.A., Palermo, Italy

[21] Appl. No.: 353,260

[22] Filed: Mar. 1, 1982

[30] Foreign Application Priority Data

Mar. 13, 1981 [IT] Italy ............................. 20344 A/81

[51] Int. Cl.³ ........................................... C08F 116/06
[52] U.S. Cl. ..................................... 525/61; 427/156; 525/62; 526/62; 526/74
[58] Field of Search ........................................... 525/61

[56] References Cited

U.S. PATENT DOCUMENTS 3,050,418  8/1962  Mendelsohn et al. ................ 525/61
3,220,991  11/1965  Martins ................................. 525/61

Primary Examiner—Stanford M. Levin

[57] ABSTRACT

A composition for lining the walls of reactors and other connected apparatus in contact with reactant mixtures and reaction products during the polymerization of vinyl compounds, which reduces or prevents polymer deposits or incrustations on the said walls, constituted by the product of the prolonged reaction at 75° C. between a polyvinyl alcohol of medium degree of hydrolysis prepared by the controlled alkaline alcoholysis of an ester of a wide molecular weight distribution polyvinyl alcohol and a polycarboxylic oxyacid, in a weight ratio of beween 35:10 and 40:10, which is applicable by known means, preferably by spraying.

6 Claims, 1 Drawing Figure

COMPOSITION FOR LINING THE WALLS OF REACTORS AND CONNECTED APPARATUS USED FOR POLYMERIZING VINYL COMPOUNDS WHICH PREVENTS OR REDUCES DEPOSITS AND INCRUSTATIONS ON SAID APPARATUS, AND THE METHOD FOR ITS USE

This invention relates to a new composition constituted by the product of the slow reaction at 70°–80° C. between a polyvinyl alcohol of medium degree of hydrolysis, prepared by the controlled alkaline alcoholysis of an ester of a wide molecular weight distribution polyvinyl alcohol and a carboxylic oxyacid such as tartaric acid, which can be used as a lining for the walls of reactors and other connected apparatus (condensers, pipes, valves etc.), which prevents or reduces polymer deposition and the formation of incrustations on the apparatus during the polymerisation of vinyl compounds.

Said lining can be conveniently applied by spraying a solution of said composition in water, using at least 50 parts of water per 100 parts of total composition. Considerable polymer quantities are known to accumulate on the reactor walls during the polymerisation of vinyl compounds in suspension, such as vinyl chloride or vinyl acetate, either alone or in mixture with other monomers.

Those parts of the apparatus in contact with the polymerisation vapour phase such as the reflux condensers are also subject to soiling. This phenomenon reduces heat transfer through the walls of the apparatus concerned, and creates difficulties in controlling the reaction, thus reducing the unit capacity. In addition, the polymerisation product can become contaminated by hard vitreous polymer granules or blocks which separate from the incrustations.

It is therefore necessary to remove the incrustations from the apparatus after each polymerisation, either manually, or by solvents or other means.

Besides interrupting operation (one hour or more each time) with consequent production reduction, environmental and personal hygiene problems arise in the case of manual removal due to the need for opening the reactors and working directly inside them.

It has been sought to obviate the incrustation drawback by various means, either by modifying the polymerisation formulations or by flushing the reactor walls with water or other solvents. It has also been attempted to treat the parts concerned with protective substances such as coating with polyurethanes or epoxy resins or applications of potassium ferrocyanate, alphamethylstyrene or its derivatives, etc.

It has now been found, and constitutes the subject matter of the present invention, that it is possible to strongly reduce or even prevent the formation of incrustations on apparatus by applying to the reactor walls, and to those parts of the apparatus involved in the polymerisation, a protective lining constituted by the ester product obtained by the prolonged reaction, at a temperature of between 60° and 80° C., between a polycarboxylic oxyacid such as tartaric acid, and a partially hydrolysed wide molecular weight distribution polyvinyl alcohol (hereinafter also known as polyvinyl alcohol) having a saponification number of between about 71 and 55, in the ratio of between 1:3.5 and 1:4 in aqueous solution, using a water quantity such that the solution contains at least 50 parts of water per 100 parts of total reaction product.

The product in question, prepared by procedures which will be described and exemplified hereinafter, can be rapidly sprayed on to those parts of the apparatus which come into contact with the polymerisation system (reactor, condensers, pipes etc.) to provide a lining of minimum thickness, between 10 and 50 microns, which totally protects the lined parts from any deposit or attack, to behave as a layer of extreme smoothness and slidability which remains permanently adhering to the lined parts.

The examples and description given hereinafter will illustrate the following:
 (a) the method for preparing an ester of a wide molecular weight distribution polyvinyl alcohol
 (b) the process for the alkaline alcoholysis of a polyvinyl ester based on a method which forms the subject matter of the Italian patent application No. 19937 A/81 filed Feb. 24, 1981
 (c) the reaction between the polycarboxylic oxyacid and a partially hydrolysed polyvinyl alcohol
 (d) the polymerisation of various monomers in apparatus treated with the reaction product of paragraph (c).

Polyvinyl acetate has been used as the polyvinyl ester in the examples given hereinafter to allow better understanding of the invention.

However, such examples must not be taken as limiting the invention, which can be advantageously applied to any polyvinyl ester.

Polymerisation tests on vinyl compounds were therefore carried out for comparison purposes in apparatus treated with partially hydrolysed polyvinyl acetate as such, with the product of the reaction between tartaric acid and a totally hydrolysed polyvinyl alcohol, and with polyvinyl alcohol having a saponification index equivalent to that described in example 3, but prepared from a polyvinyl acetate polymerised in a single charge at 70° C. for 3–5 hours from 40 kg of vinyl acetate, 0.05 kg of benzoyl peroxide and 1 kg of acetic aldehyde, having a K value of about 33 and narrow molecular weight distribution.

POLYVINYL ACETATE SYNTHESIS

Example 1

The following mixture was fed at a temperature of 80°–85° C. into a 20 liter stainless steel reactor fitted with a reflux condenser and a stirrer shaped in such a manner as to scrape the reactor bottom:

| | |
|---|---|
| Vinyl acetate | 7 kg |
| Propionic aldehyde | 0.02 kg |
| Benzoyl peroxide | 0.1 kg |

The mixture was fed over the course of at least 5 hours, preferably 6 to 8 hours, with a feed rate programmed such that the hourly feed rate was always double that of the preceding hour.

A polymer was obtained having a K value of about 35 and with widened molecular weight distribution, with considerable high and low molecular weight tails, as can be seen from the accompanying GPC diagram (FIG. 1 drawing). This wide molecular weight distribution enables polyvinyl alcohols to be obtained having a vast distribution of saponification numbers in the individual molecules.

FIG. 1 is a gel permeation chromatogram (GPC), as noted above, wherein the abscissa represents the molecular weight in arbitrary units ranging from 21–41: 22 corresponds to a molecular weight of 25,000; 24 corresponds to a molecular weight of 20,000; 27 corresponds to a molecular weight of 10,000; 32 corresponds to a molecular weight of 4,000 and 36 corresponds to a molecular weight of 2,000. The ordinate in FIG. 1 is the percentage transmittance (corresponding roughly to the number of molecules having the molecular weight reported in the abscissa of the GPC). K is a constant which is a function of both viscosity and concentration.

Example 2

The same polymer, with the same mean molecular weight and the same molecular weight distribution was also obtained by feeding the reactor of example 1 with a first portion of 0.8 kg of vinyl acetate and 0.015 kg of benzoyl peroxide, heating to 80°–85° C., and then feeding the remaining mixture of 6.2 kg of vinyl acetate, 0.018 kg of propionic aldehyde and 0.070 kg of benzoyl peroxide over a period of about 6 hours with a programmed incremental feed rate such that the hourly feed rate was always double that of the preceding hour.

The polymer obtained had the same viscosity and molecular weight distribution as the product of example 1.

POLYVINYL ACETATE ALCOHOLYSIS

The polyvinyl acetate alcoholysis can be controlled and be stopped at the required degree (or saponification number) by adjusting the alcoholysis rate, in particular by slowing it down close to the solution thickening or gelling zone. This is done, as stated in the aforesaid copending patent application, by adjusting the methyl acetate quantity fed to the solvent mixture, and secondarily by adjusting the feed of the hydrolysis catalyst.

Example 3

A solution containing 7 kg of the previously prepared polyvinyl acetate, 6.2 kg of methyl alcohol, 0.5 kg of methyl acetate and 0.01 kg of water was prepared at 60° C. in the reactor used for polymerising the vinyl acetate. After cooling to about 40° C., 0.060 kg of a 30% solution of sodium methylate in methyl alcohol were added.

A solution of 0.2 kg of sodium methylate in methyl alcohol (a 30% solution) was then fed, maintaining the feed rate such as to provide an hourly molar alcoholysis rate of 30–70%, and preferably 40–60%. The reaction was halted at the commencement of formation of the gel by neutralisation with a solution of 0.1 kg of acetic acid in 3 kg of water.

A polyvinyl alcohol was obtained having a saponification number of 295 (degree of hydrolysis 70%), of pH 6.3 and with a Brookfield viscosity of 190 cps.

PREPARATION OF THE SOLUTION FOR APPARATUS LINING

Example 4

6 kg of polyvinyl alcohol (in solution, as obtained from the alcoholysis) prepared as in example 3 were fed into a 20 liter stainless steel reactor fitted with a stirrer and condenser. After heating with direct steam to 75° C., a solution consisting of 4.5 kg of water and 1.55 kg of tartaric acid was fed over a period of at least 20 minutes.

A slight vacuum was applied (residual pressure 670 mm of mercury), and the entire mixture was stripped of solvents by a current of direct steam. A solution residue of pH 1.5–2 was obtained, containing 15–20% of solids.

The dense solution thus obtained was sprayed on to the reactor walls. A system was used consisting of a rod with a spherical nozzle having a large number of bores, the rod being inserted into the reactor and connected by a pump to the external stock of solution, with the obvious advantage of operating inside the reactor without it being necessary for an operator to enter the reactor.

Using a pressure of at least 15 kg/cm$^2$ for the spraying medium and a flow rate of about 10 kg/hour of solution, a lining was obtained having a thickness of about 20 microns, corresponding to a deposit of about 8 g of dry substance per m$^2$.

Various sets of vinyl chloride and vinyl acetate polymerisations were carried out, both in reactors protected with the various types of lining obtained from polyvinyl alcohol at different degrees of hydrolysis provided by different hydrolysis rates, either reacted with tartaric acid or not, and also in a reactor without protective lining, and the anti-incrustation effectiveness of the various types of lining was evaluated both by measuring the quantity of incrustation removed from the reactors and by evaluating the number of polymerisations possible without the need to clean the reactor.

The vinyl chloride polymerisations were carried out by the methods described in example 5 and 6, and the vinyl acetate polymerisations were carried out by the methods of example 7.

Example 5

The following formulation (the parts indicated are parts by weight, referred to 100 parts of monomer) was fed into a 25 m$^3$ reactor fitted with a stirrer operating at a speed of 120 rpm:

| | |
|---|---|
| water | 145 parts |
| methylhydroxycellulose | 0.09–0.1 parts |
| polyvinyl alcohol | 0.085 parts |
| NaHCO$_3$ | 0.02 parts |
| terbutylcyclohexyl peroxydicarbonate | 0.035 parts |
| monomeric vinyl chloride | 100 parts |

The polymerisation was carried out at a temperature of 54° C. for 10 hours until a conversion of 75–80% had been obtained. The residual monomer was then reduced by distillation.

Example 6

A reflux condenser of the tube bundle type with an area of 1.2 m$^2$ was fitted to a 4 m$^3$ reactor provided with a stirrer operating at a speed of 140 rpm. The following formulation was then fed:

| | |
|---|---|
| water | 145 parts |
| methylhydroxypropylcellulose | 0.1 parts |
| polyvinyl alcohol | 0.085 parts |
| NaHCO$_3$ | 0.02 parts |
| terbutylcyclohexyl peroxydicarbonate | 0.06 parts |
| monomeric vinyl chloride | 100 parts |

The polymerisation was carried out at a temperature of 54° C. for 5 hours, until a conversion of 80% had been obtained. Part of the heat of polymerisation was removed by the condenser.

Example 7

The following formulation (parts by weight, relative to 100 parts of monomer) was fed into the reactor, fitted with an anchor stirrer and reflux condenser:

| | |
|---|---|
| vinyl acetate | 100 parts |
| water | 90 parts |
| polyvinyl alcohol | 11.5 parts |
| dodecylbenzene sodium sulphate | 0.4 parts |
| hydrogen peroxide | 0.2 parts |

After feeding one quarter of the vinyl acetate and all the other ingredients, the temperature of the reaction bath was raised to 68° C.

On reaching this temperature, the remaining vinyl acetate was fed at a constant feed rate over about 7 hours, while always keeping the reaction temperature at 68°–70° C.

In using the reactor without protective treatment, during the vinyl chloride polymerisation tests (by the method of examples 5 and 6), on completion of the first charge the residual monomer was distilled off and the reactor was then emptied, after which the incrustation was removed manually from the walls by scraping, the quantity of incrustation collected being about 9 kg. In the case of the corresponding vinyl acetate polymerisation (by the method of example 7), the incrustation removed after one charge was of the order of 12 kg.

Both vinyl chloride and vinyl acetate were also polymerised (as described in examples 6 and 7) in the reactor provided with a protective lining obtained by spraying the product of the reaction described in example 4 between tartaric acid and the polyvinyl alcohol prepared as described in examples 2 and 3 and having a saponification number of around 300.

In the first case, after a series of eight polymerisations without cleaning the reactor, only 150 g of incrustation was collected, this being deposited mainly on the stirrer shaft, and no soiling of the condenser or other corrosion phenomena were noted after more than 250 charges. It was found possible to operate without further cleaning of the reactor for more than 30 charges.

In addition, the polymers obtained were perfectly to specification.

In the case of polyvinyl acetate, the reactor after being emptied proved to be perfectly clean without any incrustation or residue.

The results of the vinyl chloride polymerisation tests are shown in the various tables given hereinafter, both for the reactor lined with polyvinyl alcohol alone, and for the reactor lined with polyvinyl alcohol of various degrees of hydrolysis reacted with tartaric acid. When using, as the lining composition, the product of the reaction at 75° C. between tartaric acid and a polyvinyl alcohol deriving from polyvinyl acetate with narrow molecular weight distribution, i.e. produced in a single charge as indicated heretofore, and on carrying out repeated vinyl chloride polymerisation tests, it was found that only after a few charges (two or three) the lining partly separated in local zones to give rise to centres of polymer or incrustation deposition on the reactor walls and connected apparatus, with consequent worsening both of the polymerisation progress and the condition of the apparatus.

TABLE 1

Influence of the saponification number of the polyvinyl alcohol used for the reactor lining, on the soiling of the reactor (with and without reaction with tartaric acid)—alcoholysis rate 70%/hour.

| | Reaction with tartaric acid | | Grams of incrustation per m² |
|---|---|---|---|
| S.N. | hours | temperature °C. | |
| 0 | 15 | 75 | 300 |
| 0 | — | — | 350 |
| 140 | 15 | 75 | 205 |
| 140 | — | — | 230 |
| 270 | 15 | 75 | 75 |
| 270 | — | — | 180 |
| 330 | 15 | 75 | 40 |
| 330 | — | — | 170 |
| 400 | 15 | 75 | 50 |
| 400 | — | — | 200 |
| 460 | 15 | 75 | 130 |
| 460 | — | — | 270 |

TABLE 2

Influence of the alcoholysis rate on the polyvinyl alcohol (of Ser. No. 340) with and without reaction with tartaric acid, on the soiling of the reactor.

| Hourly alcoholysis rate | Reaction with tartaric acid | | Grams of incrustation per m² |
|---|---|---|---|
| | Duration (hours) | Temperature °C. | |
| 20 | 15 | 75 | 95 |
| 20 | — | — | 160 |
| 30 | 15 | 75 | 70 |
| 30 | — | — | 135 |
| 40 | 15 | 75 | absent |
| 40 | — | — | 118 |
| 50 | 15 | 75 | absent |
| 50 | — | — | 100 |
| 60 | 15 | 75 | absent |
| 60 | — | — | 110 |
| 70 | 15 | 75 | 35 |
| 70 | — | — | 150 |
| 80 | 15 | 75 | 80 |
| 80 | — | — | 175 |

We claim:

1. A composition useful as a lining for the walls of reactors and other apparatus connected thereto, said lining capable of substantially preventing or reducing polymer deposition and the formation of incrustations on said walls during the polymerizations of vinyl compounds therein, said composition comprised of the tartaric acid ester of a polyvinyl alcohol having a saponification number between about 270 and about 400.

2. A composition as defined in claim 1 wherein said ester is formed by the reaction of tartaric acid with said polyvinyl alcohol at a temperature between about 60° C. and about 80° C. for at least about 20 minutes.

3. A composition as defined in claim 2 wherein said reaction temperature is between about 70° C. and about 80° C.

4. A composition as defined in claim 3 wherein said reaction temperature is about 75° C.

5. A composition as defined in claim 2 wherein the weight ratio of said polyvinyl alcohol to said tartaric acid is between about 35 to 10 and about 40 to 10.

6. A composition as defined in claim 2 wherein said polyvinyl alcohol is prepared by alkaline hydrolysis of polyvinyl acetate at an hourly hydrolysis rate between about 40% and about 60%.

* * * * *